(12) United States Patent
Phan et al.

(10) Patent No.: US 6,174,960 B1
(45) Date of Patent: Jan. 16, 2001

(54) COATING COMPOSITIONS PREPARED WITH AN ACRYLIC MODIFIED ETHYLENE-VINYL ACETATE POLYMER

(75) Inventors: Lien Phan, Mississauga; Rajeev Farwaha, Brampton, both of (CA)

(73) Assignee: National Starch and Chemical Investmnent Holding Corporation, Wilmington, DE (US)

( * ) Notice: Under 35 U.S.C. 154(b), the term of this patent shall be extended for 0 days.

(21) Appl. No.: 09/227,751

(22) Filed: Jan. 8, 1999

(51) Int. Cl.$^7$ .................................................. C08F 218/08
(52) U.S. Cl. ......................... 525/191; 528/32; 524/501; 524/506; 524/800; 524/804; 524/806; 524/812; 524/178; 524/401; 428/447; 427/387
(58) Field of Search ............................... 525/191; 528/32; 427/387; 524/506, 800, 804, 806, 812, 178, 401; 428/447

(56) References Cited

U.S. PATENT DOCUMENTS

| | | | |
|---|---|---|---|
| 3,706,697 | 12/1972 | Backderf | 260/29.2 M |
| 3,729,438 | 4/1973 | Plesich et al. | 260/29.6 R |
| 4,680,335 | 7/1987 | Chambers et al. | 524/501 |
| 5,308,890 | 5/1994 | Snyder | 523/201 |
| 5,605,952 | 2/1997 | Esser | 524/522 |
| 5,827,922 | * 10/1998 | Chen et al. | |

FOREIGN PATENT DOCUMENTS

| | | | |
|---|---|---|---|
| 2045366 | 1/1992 | (CA) | C09D/157/00 |
| 97/15624 | 5/1997 | (WO) | C08L/43/04 |

OTHER PUBLICATIONS

Chen, Ming J., et al., "Silanes in High–Solids and Waterborne Coatings", Journal of Coatings Technology, vol. 69, No. 870, Jul. 1997, pp. 43–51.

* cited by examiner

Primary Examiner—Robert Dawson
Assistant Examiner—Kuo-Liang Peng
(74) Attorney, Agent, or Firm—Thomas F. Roland, Esq.

(57) ABSTRACT

A non-aqueous—organic-solvent-free coating composition having increased block resistance comprising an acrylic modified ethylene-vinyl acetate (EVA) polymer blend, wherein the acrylic polymer is prepared by emulsion polymerizing at least one ethylenically unsaturated non-carboxy functional monomer, from 0.01 to 2 pphm of a sterically hindered alkoxylated silane monomer, and at least one anionic surfactant, and the ethylene-vinyl acetate polymer is prepared by emulsion polymerizing ethylene and vinyl acetate.

25 Claims, No Drawings

COATING COMPOSITIONS PREPARED WITH AN ACRYLIC MODIFIED ETHYLENE-VINYL ACETATE POLYMER

FIELD OF THE INVENTION

This invention relates to a non-aqueous—solvent-free coating composition having increased block resistance comprising an acrylic modified ethylene-vinyl acetate polymer blend, wherein the acrylic polymer is prepared by emulsion polymerizing at least one ethylenically unsaturated non-carboxy functional monomer, from 0.01 to 2 pphm of a sterically hindered alkoxylated silane monomer, and at least one anionic surfactant, and the ethylene-vinyl acetate polymer is prepared by emulsion polymerizing ethylene and vinyl acetate.

BACKGROUND OF THE INVENTION

Dry paint often comes in contact with itself especially in window and door areas and, depending on its hardness, the pressure, temperature, humidity, and duration of time which the surfaces are in contact, the painted surfaces sometimes stick together. This undesirable sticking together of two painted surfaces when pressed together or placed in contact with each other is referred to as "blocking". Thus, an important characteristic of coatings is lock resistance.

The glass transition temperature (Tg) of a polymer is an inherent physical property of the monomer or monomers used to make the polymer. The Tg of a polymer determines the relative hardness or softness of the polymer. The higher the polymer's Tg the harder the polymer, and the lower the polymer's Tg the softer the polymer. The Tg of a polymer determines the physical characteristics of a film formed from a coating composition containing the polymer, as well as the minimum temperature at which the coating composition containing the polymer can be applied to a substrate to form a film.

Increasing the Tg of a polymer useful as a binder in a coating will increase the hardness of the final coating. The hardness of a coating is important because it affects other desirable properties of the coating such as block resistance.

Although an aqueous coating can be formulated with a polymer that gives the desired balance of hardness properties, it can lack adequate film formation properties; this may result in a coating which is brittle or inflexible. Adequate film formation is indicated by the formation of a continuous coating free from defects such as, for example, cracks and flakes. As used herein, "brittleness" refers to the tendency of a coating to crack or snap when subjected to a deformation, such as, for example, movement or temperature change. It is not desirable for a coating to have brittleness. It is desirable for a coating to have flexibility. As used herein, "flexibility", refers to the degree to which a coating, after drying, is able to conform to movement or deformation of its supporting surface, without cracking or flaking. The need for flexibility is demonstrated by coatings which are subjected to stress by substrates which expand or contract when exposed to changes in weather, such as, for example, bridges, building shingles, and the like.

As the Tg of the polymer used as the binder in the aqueous coating is increased, the hardness of the coating is increased, and the minimum temperatures required for the coating to form a film, herein after referred to as the "Minimum Film Formation Temperature" or "MFT" is also increased. If the polymer is selected for its ability to contribute hardness to the coating, but the coating will not form a film at the temperatures at which it is to be applied, the coating formulation is not useful. Therefore, it is necessary to add a coalescent to the coating formulation. A coalescent is an organic solvent that lowers the MFT of the polymer, thereby permitting the coating to form a useful film at a temperature below the Tg of the polymer. Coalescents, such as for example 2,2,4-trimethyl-1,3-pentanediol monoisobutyrate (Texanol), are typically employed in coating formulations at concentrations of from about 3 to about 80 percent by weight based on the weight of the polymeric binder solids.

The use of coalescents has proven to be a very useful way to solve the problem of containing certain desired film properties with high Tg polymers, which do not readily form films at desired application temperatures; however, this solution has created another problem. During the drying of a coalescent containing formulation, the organic solvents evaporate and enter into the atmosphere. In addition to the unpleasant odor associated with these organic solvents, there is growing concern about the potentially adverse environmental and health effects of many of these organic solvents.

Blends of hard and soft emulsion polymers are known in the art. EP 466,409 A1 describes a system which contains a mixture of a hard latex with Tg greater than 20° C., and a soft latex with a Tg less than 15° C. The blend system described in EP 466,409 A1 is disclosed to result in films with adequate film formation and hardness without the use of a coalescent.

U.S. Pat. No. 5,308,890 describes a blend of emulsion polymers containing a soft stage polymer having a Tg of less than 50° C. and a hard stage polymer having a Tg of from 20° C. to 160° C. wherein the Tg of the soft stage polymer is lower than the Tg of the hard stage polymer and the hard stage polymer does not form a film at ambient temperature.

There is a need for an emulsion polymer for aqueous coatings which provides desirable hardness properties, adequate film formation at temperatures approaching 0° C., and flexibility. In addition, it is also desirable to reduce or eliminate the amount of organic solvents in an aqueous coating without compromising physical properties of film formation.

SUMMARY OF THE INVENTION

The present invention provides a non-aqueous—solvent-free coating composition comprising an acrylic modified ethylene-vinyl acetate polymer blend which comprises:

(a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure

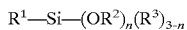

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

According to another aspect the invention provides a method of making a non-aqueous—solvent-free coating composition comprising: (I) preparing the acrylic modified ethylene-vinyl acetate polymer blend; (II) applying the polymer blend to at least one surface of a substrate; and (III) drying the polymer blend to form a film.

According to another aspect the invention provides a paint formulation comprising at least one pigment, rheology modifier, surfactants, and the acrylic modified ethylene-vinyl acetate polymer blend.

The sterically hindered alkoxysilane functionality of the silanes crosslink during film formation, most probably after particle coalescence, resulting in a crosslinked coating with improved block resistance. Moreover, The steric hindrance of the alkoxylated silane minimizes hydrolysis of the alkoxylated group during polymerization of the acrylic polymer and storage of the acrylic modified ethylene-vinyl acetate polymer blend.

DESCRIPTION OF THE INVENTION

The solvent-free coating compositions of the present invention are prepared from a blend of aqueous emulsion polymers which are curable to form a film. The blend contains an ethylene-vinyl acetate (EVA) polymer and an acrylic polymer. The coating compositions do not require the presence of coalescing agents or volatile organic solvents. As used herein, "emulsion" means a dispersion of particulate matter in an aqueous phase which contains an emulsifier or surfactant suitable for preparing the emulsion. The emulsion polymers are prepared using free radical emulsion polymerization techniques which are known in the art.

The ethylene-vinyl acetate (EVA) polymer is an aqueous emulsion polymerization product of ethylene, vinyl acetate, and a ethylenically unsaturated hydroxy-functional monomer to form an emulsion copolymer. The amount of ethylene monomer used to prepare the EVA polymer is from about 4 to about 25 weight percent, preferably from about 10 to about 20 weight percent, based on the total weight of monomers used to prepare the EVA polymer. The amount of vinyl acetate used to prepare the EVA polymer is from about 67 to about 95 weight percent, preferably from about 75 to about 90 weight percent, based on the total weight of monomers used to prepare the EVA polymer.

It is important to note that up to about 30 weight percent, preferably less than 15 weight percent, more preferably less than 10 weight percent, of the vinyl acetate in the EVA polymer may be substituted with one or more ethylenically unsaturated comonomers. Preferred ethylenically unsaturated comonomers include acrylate monomers and ethylenically unsaturated monomers which contain at least one carboxyl group attached directly to the olefinic carbon. Examples of acrylate monomers are esters of monocarboxylic acids and the di-esters of dicarboxylic acids. Preferred acrylate monomers are selected from $C_1$–$C_{10}$ alkyl esters of $\alpha,\beta$-ethylenically unsaturated $C_2$–$C_6$ monocarboxylic acids; hydroxy $C_1$–$C_4$ alkyl esters of $\alpha,\beta$-ethylenically unsaturated $C_2$–$C_6$ monocarboxylic acids; and $C_4$–$C_8$ alkyl diesters of $\alpha,\beta$-ethylenically unsaturated $C_4$–$C_8$ dicarboxylic acids. More preferably, the acrylate monomer is selected from the group consisting of $C_1$–$C_{10}$ alkyl esters of acrylic and methacrylic acid and $C_4$–$C_8$ alkyl di-esters of maleic, itaconic and fumaric acids. Specific examples of acrylate monomers include methyl acrylate, ethyl acrylate, butyl acrylate, 2-ethyl hexyl acrylate, decyl acrylate, methyl methacrylate, butyl methacrylate, Iso-butyl methacrylate, Iso-bornyl methacrylate hydroxy ethyl acrylate and hydroxy ethyl methacrylate.

Examples of monomers which contain at least one carboxyl group attached directly to the olefinic carbon are $\alpha,\beta$-ethylenically unsaturated $C_3$–$C_8$ monocarboxylic acids, $\alpha,\beta$-ethylenically unsaturated $C_4$–$C_8$ dicarboxylic acids and the anhydrides thereof, and the $C_4$–$C_8$ alkyl half-esters of the $\alpha,\beta$-ethylenically unsaturated $C_4$–$C_8$ dicarboxylic acids. Such monomers are preferably selected from acrylic acid and methacrylic acid, and the $C_4$–$C_8$ alkyl half esters of maleic acid, maleic anhydride, fumaric acid, and itaconic acid.

The acrylic polymer is an aqueous emulsion polymerization product of an ethylenically unsaturated non-carboxy functional monomer, from 0.01 to 2 pphm of a sterically hindered alkoxylated silane monomer, optionally from 0.1 to 5 pphm of an ethylenically unsaturated carboxy-functional monomer, optionally from 0.1 to 5 pphm of a wet adhesion monomer, and an anionic surfactant. The sterically hindered alkoxylated silane is incorporated in the backbone of the acrylic polymer. The steric hindrance of the alkoxylated silane minimizes hydrolysis of the alkoxylated group during polymerization of the acrylic polymer and storage of the acrylic modified ethylene-vinyl acetate polymer blend.

The ethylenically unsaturated non-carboxy functional monomer is selected from vinyl esters, alpha olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, sulfonated monomers, vinyl amide monomers, and anhydrides. A combination of ethylenically unsaturated non-carboxy functional monomers may also be used to prepare the acrylic polymer.

Suitable vinyl esters are, for example, vinyl acetate, vinyl formate, vinyl propionate, vinyl butyrate, vinyl isobutyrate, vinyl valerate, vinyl 2-ethyl-hexanoate, etc. Suitable alkyl esters of acrylic and methacrylic acid are, for example, methyl acrylate, methyl methacrylate, ethyl acrylate, ethyl methacrylate, butyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable unsaturated carboxylic acids are, for example, crotonic acid, acrylic acid, methacrylic acid, fumaric acid, maleic acid, itaconic acid, citraconic acid, and their alkyl esters, etc.

Suitable vinyl aromatic monomers are, for example, styrene, 3-isopropenyl-$\alpha$, $\alpha$-dimethylbenzyl isocyanate 1-vinyl napthalene, 2-vinyl napthalene, 3-methyl styrene, 4-propyl styrene, t-butyl styrene, etc. Suitable acrylamide based monomers are, for example, acrylamide, N, N dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated styrene, etc.

Suitable vinyl amide monomers are, for example, N-vinyl formamide, N-vinyl acetamide, etc. Suitable $\alpha$-olefin based monomers are, for example, $C_4$–$C_{20}$ based alkyl monomers such as 1-octene, butylene, 1-dodecene, etc. The ethylenically unsaturated monomer is preferably styrene. Suitable anhydride monomers are maleic anhydride and itaconic anhydride.

In a preferred embodiment of the invention, the ethylenically unsaturated non-carboxy functional monomer is an alkyl acrylate monomer having the structure:

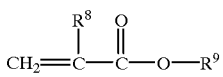

wherein R⁸ is hydrogen or methyl and R⁹ is an alkyl group having from 1 to 10 carbon atoms. The alkyl groups in the alkyl acrylate monomers can be straight chained or branched. The ethylenically unsaturated monomer is 5 preferably selected from methyl methacrylate, butyl acrylate, vinyl acetate, 2-ethylhexyl acrylate, and combinations thereof.

Optionally, an ethylenically unsaturated carboxy-functional monomer may be used in preparing the acrylic polymer. The ethylenically unsaturated carboxy-functional monomer has been shown to impart mechanical stability to the coating composition, especially during mixing of the emulsion polymer with the other components of a paint formulation. The ethylenically unsaturated carboxy-functional monomer is used to prepare the emulsion polymer in an amount of from about 0.1 to about 5 pphm, preferably from about 0.5 to about 2 pphm.

Suitable ethylenically unsaturated carboxy-functional monomers are α,β-ethylenically unsaturated $C_3$–$C_8$ monocarboxylic acids, α,β-ethylenically unsaturated $C_4$–$C_8$ dicarboxylic acids, including the anhydrides thereof, and the $C_4$–$C_8$ alkyl half esters of the α,β-ethylenically unsaturated $C_4$–$C_8$ dicarboxylic acids. Preferred ethylenically unsaturated carboxy-functional monomers are acrylic acid, methacrylic acid, and the $C_4$–$C_8$ alkyl half esters of maleic acid, maleic anhydride, fumaric acid, carboxyethylacrylate, and itaconic acid. Most preferably, the ethylenically unsaturated carboxy-functional monomer is acrylic acid or methacrylic acid. A combination of ethylenically unsaturated carboxy-functional monomers may also be used to prepare the acrylic polymer.

Optionally, the acrylic polymer may also include at least one wet adhesion monomer. The wet adhesion monomer is present in an amount of from about 0.1 to about 5 pphm, preferably 0.5 to 2 pphm. In order to optimize the wet adhesion of the latex paint formulation, the acrylic polymer may comprise 0 to 2 pphm of the polymerized residue of a wet adhesion monomer, or a combination of wet adhesion monomers. Wet adhesion monomers are well known in the art and include aminoethyl acrylate and methacrylate, dimethylaminopropyl acrylate and methacrylate, 3-dimethylamino-2, 2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N(3-dimethlamino-2, 2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacrloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-[3-(1,3-diazacryclohexan)-2-on-propy]methacrylamide, 2-(1-imidazolyl)ethyl methacrylate, 2-(1-imidazolidin-2-on)ethylmethacrylate, N-(methacrylamido)ethyl urea (SIPOMER WAM II, Rhone-Poulenc) and allyl ureido wet adhesion monomer (SIPOMER WAM, Rhone Poulenc). Preferably the wet adhesion monomer is a ureido-functional monomer.

The sterically hindered alkoxylated silane monomer is present in a critical amount of from 0.01 to 2 pphm, preferably 0.05 to 1 pphm. The sterically hindered alkoxylated silane monomer has the structure:

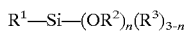

wherein R¹ is selected from the group consisting of an alkylene, arylene, and aralkylene group; R² is independently a sterically hindered alkyl group having 3 to 10 carbon atoms in a straight or branched chain configuration; R³ is a monovalent alkyl group having 1 to 10 carbon atoms; and n is an integer of from 1 to 3.

Suitable sterically hindered alkoxylated silane monomers are vinyltriisopropoxy silane, vinylpropyltriisopropoxy silane, vinylpropyltriisobutoxy silane, vinyltriisobutoxy silane, vinylpentyltri-t-butoxy silane, vinylpropylmethyldipentoxy silane, vinylpropyltri-sec-butoxysilane. The sterically hindered alkoxylated silane monomer is preferably vinyltriisopropoxysilane.

While not wishing to be bound by any particular theory, the present inventors believe that crosslinking occurs between the sterically hindered alkoxysilane functionality on the acrylic polymer by means of a hydrolysis reaction to give silanols with subsequent condensation reaction between silanols and/or carboxyl groups on the acrylic polymer. Such crosslinking occurs during film formation of the coating composition, most probably after particle coalescence or drying of the coating composition. The advantage of preparing the coating composition with sterically hindered alkoxylated silane monomers is that crosslinking during the emulsion polymerization of the acrylic polymer and storage of the acrylic modified ethylene-vinyl acetate polymer blend, especially in the presence of carboxyl groups, is minimized.

The acrylic polymer is present in the acrylic modified ethylene-vinyl acetate polymer blend in an amount of from about 15 to about 50 weight percent, preferably from about 20 to about 30 weight percent, based on the total weight of the acrylic polymer and the ethylene-vinyl acetate polymer. The ethylene-vinyl acetate polymer is present in an amount of from about 50 to about 85 weight percent, preferably from about 70 to 80 weight percent, based on the total weight of the acrylic polymer and the ethylene-vinyl acetate polymer.

The aqueous emulsion polymers are prepared with one or more surfactants or emulsifiers. In the case of the acrylic polymer, at least one anionic surfactant is used to prepare the acrylic polymer. The present inventors have determined that acrylic polymers prepared with only nonionic surfactants do not provide satisfactory block resistance. However, in the case of the ethylene-vinyl acetate polymer, the type of surfactant is not critical and anionic surfactants are not required but are preferred. Suitable anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to C16 alkylsulfosuccinates or from $C_{12}$ to $C_{16}$ sulfated ethoxylated alkanols. Preferably, the anionic surfactant has less than 9 moles of ethylene oxide blocks.

In addition to the anionic surfactant, a minor amount of a nonionic surfactant may be used to prepare the acrylic polymer. As used herein, "minor amount" of nonionic surfactant means that the nonionic surfactant is present in an amount of less than 25 weight percent, preferably less than 10 weight percent, based on the total weight of surfactant used to prepare the acrylic polymer.

Suitable nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Water-soluble or water-dispersible polymerizable surfactants may also be used alone or in combination with non-polymerizable surfactant(s) to prepare the aqueous emulsion polymers of the invention. A preferred polymerizable surfactant is an allyl amine salt of alkyl benzene sulfonate denoted Structure I:

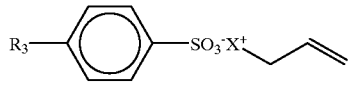

In Structure I, $R_3$ is an alkyl group having 1 to 20 carbon atoms, preferably 1 0 to 18 carbon atoms; and X+ is selected from $NH_3^+$, $NH_2R_6$ or $NR_6 R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant is an allyl amine salt of alkyl ether sulfate denoted Structure II:

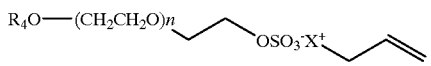

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant is an allyl amine salt of a phosphate ester denoted Structure III:

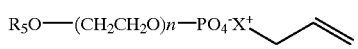

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of a phosphate ester is allyl amine salt of nonyl phenol ethoxylate (9 moles EO) phosphate ester. Preferred polymerizable surfactants are available under the trademarks POLYSTEP AU1, POLYSTEP AU7 and POLYSTEP AU9 from Stepan Company.

Although the solids content of the emulsion polymers and viscosity of each of the emulsion polymers can vary, typical total solids content which is defined as the nonvolatile components of each emulsion is preferably in the range of from about 40 to about 70 weight percent, more preferably from about 50 to about 60 weight percent, based on the total weight of the emulsion.

In one embodiment of the invention, the non-aqueous—solvent-free coating composition is prepared by a method comprising: (I) preparing the acrylic modified ethylene-vinyl acetate polymer blend; (II) applying the polymer blend to at least one surface of a substrate; and (III) drying the polymer blend to form a film.

In another embodiment of the invention, the non-aqueuos—solvent-free coating composition is prepared by a method comprising: (I) preparing the acrylic modified ethylene-vinyl acetate polymer blend; (II) mixing a Lewis acid or a tin catalyst with the acrylic modified ethylene-vinyl acetate polymer blend to form a coating composition; (III) applying the coating composition to at least one surface of a substrate; and (IV) drying the coating composition to form a film.

The Lewis acid is selected from carboxylic acids, dicarboxylic acids, mineral acids, sulfuric acid, and phosphoric acid. A preferred Lewis acid is sulfuric acid. A preferred tin catalyst is a diorganotin thioglycerates. A combination of Lewis acids and/or tin catalysts may be used. The Lewis acid and/or tin catalyst is added in an amount of from about 0.1 to about 5 weight percent, preferably from about 0.5 to about 2 weight percent, based on the percent solids of the acrylic modified ethylene-vinyl acetate polymer blend.

The non-aqueous—solvent-free coating compositions of the present invention may additionally contain other additives which include pigments such as titanium oxide, extenders such as flour, i.e., walnut shell flour, dispersing agents, defoaming agents, anti-freezing agents, preservatives, surfactants, sequestering agents, coalescing agents, defoaming agents, humectants, thickeners, defoamers, colorants, waxes, bactericides, fungicides, and fillers such as cellulose or glass fibers, clay, kaolin, talc, calcium carbonate and wood meal, and odor-modifying agents.

In preparing the non-aqueous—solvent-free coating compositions of this invention, the emulsion polymers or acrylic modified ethylene-vinyl acetate polymer blend are mixed with the additive(s). The additive(s) may be added during the polymerization, after the polymerization and prior to the addition of the Lewis acid or tin catalyst, or with the addition of the Lewis acid or tin catalyst.

The non-aqueous—solvent-free coating compositions may be applied to a wide variety of materials such as, for example, wood, cement, concrete, nonwoven or woven fabrics, aluminum or other metals, glass, ceramics, glazed or unglazed, tiles, polyvinyl chloride and polyethylene terephthalate and other plastics, plaster, stucco, roofing substrates such as asphaltic coatings, roofing felts, synthetic polymer membranes, and foamed polyurethane insulation. In addition, the coating compositions may be applied to previously painted, primed, undercoated, worn, or weathered substrates.

The following nonlimiting examples illustrate further aspects of the invention.

EXAMPLE 1

Comparative

An aqueous emulsion polymer without a silane was prepared according to the following formula:

| Ingredients | Grams | Concentration in pphm |
|---|---|---|
| Initial water | 402 | 52.18 |
| Monomer Mixture | | |
| Water | 240 | 31.15 |
| Sodium Lauryl Sulfate | 70 | 9 |
| Methacrylic acid (MAA) | 7.7 | 1 |
| Butyl acrylate (BA) | 401.6 | 52.1 |
| Methyl Methacrylate | 356 | 46.2 |
| Rohamere 6844-0 | 17 | 2.2 |

-continued

| Ingredients | Grams | Concentration in pphm |
|---|---|---|
| Catalyst Solution | | |
| Water | 75 | 9.7 |
| Sodium persulfate | 4 | 0.5 |

In a three liter vessel, equipped with a reflux condenser, addition funnels, and stirrer, the Initial charge was added to the reactor with agitation of 100 rpm. The reactor was heated to 78° C. A 92 gram portion of the Monomer Mixture and 20 grams of the Catalyst Solution were then charged to the reaction vessel and the reaction mixture was held for 20 minutes at 78° C. The remainder of the Monomer Mixture was metered into the reaction over a period of three hours. During the same three hour period, the Catalyst Solution was slow added to the reactor over a period of three hours. The reaction was held for 30 minutes at 78° C. Then 0.6 grams of tertiary butyl hydroperoxide in 5 grams water and 0.3 grams sodium formaldehyde sulfoxylate were added to the reactor. The pH of the emulsion polymer was adjusted to 8.0 by the addition of 26.6% aqueous ammonium hydroxide solution. The physical properties of the emulsion polymer are summarized in Table I.

EXAMPLE 2

An emulsion polymer was prepared using the procedure and formula according to Example 1, except that 0.3 pphm of vinyltriisopropoxysilane was added to the Monomer Mixture. The physical properties of the emulsion polymer are summarized in Table I.

EXAMPLE 3

An emulsion polymer was prepared using the procedure and formula according to Example 1, except that 0.5 pphm of vinyl-tris-(2-methoxyethoxy) silane was added to the Monomer Mixture. The physical properties of the emulsion polymer are summarized in Table I.

EXAMPLE 4

An emulsion polymer was prepared using the procedure and formula according to Example 1, except that 0.5 pphm of gamma- methacryloxypropyltri-methoxysilane was added to the Monomer Mixture. The physical properties of the emulsion polymer are summarized in Table I.

EXAMPLE 5

An emulsion polymer was prepared using the procedure and formula according to Example 1, except that 0.5 pphm of vinyltriisopropoxysilane was added to the Monomer Mixture. The physical properties of the emulsion polymer are summarized in Table I.

EXAMPLE 6

An emulsion polymer was prepared using the procedure and formula according to Example 1, except that 1 pphm of vinyltriisopropoxysilane was added to the Monomer Mixture. The physical properties of the emulsion polymer are summarized in Table I.

EXAMPLE 7

An emulsion polymer was prepared using the procedure and formula according to Example 5, except that 1 pphm of γ-carboxy ethyl acrylate was added to the Monomer Mixture in place of 1 pphm of methacrylic acid. The physical properties of the emulsion polymer are summarized in Table III.

EXAMPLE 8

An emulsion polymer was prepared using the procedure and formula according to Example 5, except that 1 pphm of acrylic acid was added to the Monomer Mixture in place of 1 pphm of methacrylic acid. The physical properties of the emulsion polymer are summarized in Table III.

EXAMPLE 9

An emulsion polymer was prepared using the procedure and formula according to Example 5, except that 1 pphm itaconic acid was added to the Monomer Mixture in place of 1 pphm of methacrylic acid. The physical properties of the emulsion polymer are summarized in Table I.

TABLE I

Physical Properties of Polymers Prepared in Examples 1–9.

| Polymer Prepared In Ex. | % Solid | Viscosity (cps) | Particle Size (nm) |
|---|---|---|---|
| Example 1 | 49.8 | 105 | 128 |
| Example 2 | 50.6 | 190 | 136 |
| Example 3 | 50.05 | 180 | 132 |
| Example 4 | 50.2 | 170 | 136 |
| Example 5 | 50.94 | 190 | 135 |
| Example 6 | 50.95 | 210 | 136 |
| Example 7 | 49.2 | 111 | 134 |
| Example 8 | 48.8 | 145 | 148 |
| Example 9 | 48.86 | 39 | 144 |

EXAMPLE 10

Preparation of EVA Polymer.

An ethylene-vinyl acetate polymer was prepared using the following semi-continuous emulsion polymerization process:

| | Initial Charge | |
|---|---|---|
| Compound | Grams | Conc.in pphm |
| Water | 2200.0 | 55.00 |
| Cellosize QP09L | 36.0 | 0.90 |
| Non-ionic Emulsifier[1] | 178.0 | 4.15 (Active) |
| Anionic Emulsifier[2] | 36.0 | 0.18 (Active) |
| Vinyl Acetate | 850.0 | 21.25 |
| Ethylene | 575 | 11.00 |
| Monomer Slow-Add | | |
| Vinyl Acetate | 2536.8 | 63.75 |
| Butyl Acetate | 159.2 | 4.0 |
| β-Carboxyethyl Acrylate | 0.3 | 0.075 |
| Initiator Slow-Add | | |
| Water | 250.0 | 6.25 |
| Sodium Persulfate | 8.32 | 0.21 |
| Sodium Bicarbonate | 2.50 | 0.06 |
| Reducer Slow-Add | | |
| Water | 250.0 | 6.25 |
| SFS | 6.76 | 0.17 |

-continued

| | Compound | Grams | Conc.in pphm |
|---|---|---|---|
| | Initial Charge | | |
| | Redox Scavenger | | |
| 1) | Water | 15.0 | 0.38 |
| | Temp | 6.0 | 0.15 |
| 2) | Water | 70.0 | 1.75 |
| | SFS | 6.0 | 0.15 |
| | pH Adjustment | | |
| | Water | 90.0 | 2.25 |
| | Sodium Bicarbonate | 5.0 | 0.13 |
| | Preservative Adds | | |
| | Water | 5.0 | 0.13 |
| | Hydrogen Peroxide | 5.0 | 0.13 |
| | Water | 10.0 | 0.25 |
| | Kathon LX (1.5%) | 13.7 | 0.34 |

Non-ionic Emulsifier[1] is a blend of nonylphenol ethoxylate and Pluronic nonionic surfactants.
Anionic Emulsifier[2] is an alkyl benzene sulfonate.

In a 10-liter autoclave, an initial charge of water, surfactant, vinyl acetate and butyl acrylate was charged. The reactor was flushed with ethylene and the agitator was set at 400 rpm. The temperature was raised to 50° C. and the ethylene was added to a pressure to 575 psig. When the contents of the reactor reaches 50° C., the redox slow adds are started at a 3 hour slow-add rate and changed to 4.5 hour rate after the contents reach 52° C. When the content temperature increases to 52° C. to 53° C. and while the jacket remains at 50° C., redox slow adds are adjusted to 4.5 hour rate and the jacket is set to 65° C. When contents reach 65° C. after a 5 minute period, the 4 hour of monomer slow-add is commenced. The jacket is set to cascade to keep contents at 65° C. throughout the reaction period. After monomer slow-add is finished and free vinyl acetate content is approximately 2 percent, the contents are pumped to a hold tank having agitator set at approximately 200 rpm. A redox addition is added, followed by defoamer, buffer solution, redox scavenger and preservative. The resulting latex was designated 1A and showed the following physical properties: 54.9% solids; 400 nm particle size; 6.6° C. Tg; MFFT <0° C.; 2780 cps viscosity.

EXAMPLE 11
Preparation of Acrylic Modified/EVA Blends.

Blend A was prepared by mixing 25 weight percent of the acrylic polymer prepared in Example 1 with 75 weight percent, based on the total weight of polymer, of the EVA polymer prepared in Example 10.

Blend B was prepared by mixing 25 weight percent of the acrylic polymer prepared in Example 2 with 75 weight percent, based on the total weight of polymer, of the EVA polymer prepared in Example 10.

Blend C was prepared by mixing 25 weight percent of the acrylic polymer prepared in Example 5 with 75 weight percent, based on the total weight of polymer, of the EVA polymer prepared in Example 10.

Blend D was prepared by mixing 25 weight percent of the acrylic polymer prepared in Example 6 with 75 weight percent, based on the total weight of polymer, of the EVA polymer prepared in Example 10.

EXAMPLE 12
Evaluation of Blends A–D in a Solvent-Free Semi-Gloss Paint Formulation at 25% Pigment Volume Concentration (PVC).

| | Grams |
|---|---|
| Grind | |
| Water | 150.0 |
| BYK-156 | 6.0 |
| BYK-034 | 2.0 |
| KRONOS 2020 | 290.0 |
| ASP 170 | 50.0 |
| Water | 75 |
| Letdown | |
| Water | 35.4 |
| IGEPAL CO-630 | 2.0 |
| Polymer Blend | 551.0 |
| POLYPHOBE 9831 | 9.0 |
| BYK-034 | 2.0 |
| AMP-95 | 2.5 |
| KATHON LX 1.5% | 0.5 |
| Total | 1275.4 |

BYK-156 is a acrylic copolymer available from BYK Chemie.
BYK-034 is a defoamer available from BYK Chemie.
KRONOS 2020 is a titanium dioxide pigment available Kronos.
KATHON LX is a preservative available from Rohm & Haas.
ASP-170 is an aluminum silicate extender pigment.
POLYPHOBE is a thickener available from Union Carbide.
AMP-95 is a buffer available from Angus Chemicals.

In a high speed dispersator, the Grind was dispersed. The Letdown was added to the dispersion and mixed for 15 minutes. The paints were evaluated in relation to their 200 and 600 gloss (ASTM D 523-80), scrub resistance (ASTM D 2486), and wet adhesion.

Wet Adhesion was determined as follows:

Scrub panels were prepared by drawing down a 3 mil film of a semi-gloss alkyd base (chosen as being the most difficult test for the wet adhesion) onto a leneta chart. The charts were aged at least one month at room temperature. The test latex paints were then drawn down into a 3 mil film onto the aged alkyd surface and allowed to dry for 48 hours. The dried charts were affixed to glass panels and put into the scrub machine equipped with a scrub brush and a basin for holding the panel. The brush was conditioned by immersing it in warm water for 30 minutes and then placed in the machine hold. The test panel was placed in the basin under the brush and 200 grams of warm water (50° C.) were added to the basin. The scrub machine was started and run for 200 cycles. If the coating remained intact, 8 grams of a dry abrasive (Ajax) were placed under the brush and the machine run for 50 cycles. The last step was repeated until the coating failed, that is, when the test paint stripped from the alkyd base. The number of cycles to failure was recorded.

TABLE II

Performance Properties of Emulsion Polymers in Non-aqueous-solvent-free Semi-Gloss Paint Formulations

| Solvent-Free Semi-Gloss Paints | Polymer Blend A | Polymer Blend B | Polymer Blend C | Polymer Blend D |
|---|---|---|---|---|
| Gloss (20/ 60°) 7 days dry | 24.9 / 66.3 | 26.9 / 67.3 | 26.9 / 68.1 | 26.8 / 68.1 |

TABLE II-continued

Performance Properties of Emulsion Polymers in Non-aqueous-solvent-free Semi-Gloss Paint Formulations

| Solvent-Free Semi-Gloss Paints | Polymer Blend A | Polymer Blend B | Polymer Blend C | Polymer Blend D |
|---|---|---|---|---|
| Block resistance (50° C./RT) | | | | |
| 1 day dry | 4 / 4 | 7 / 7 | 8 / 8 | 8 / 8 |
| 2 days dry | 5 / 6 | 7 / 8 | 8 / 8 | 8 / 8 |
| 7 days dry | 7 / 7 | 8 / 8 | 8 / 8 | 8 / 8 |
| Scrub resistance (cycles) | 454 | 505 | 579 | 580 |
| Wet adhesion (cycles) | 1000 | 1500 | 1950 | 1800 |

While the invention has been described with particular reference to certain embodiments thereof, it will be understood that changes and modifications may be made by those of ordinary skill within the scope and spirit of the following claims.

What is claimed is:

1. A non-aqueous-solvent-free coating composition comprising an acrylic modified ethylene-vinyl acetate polymer blend which comprises:
   (a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure $$R^1\text{---Si---}(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
   (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

2. A non-aqueous-solvent-free coating composition comprising an acrylic modified ethylene-vinyl acetate polymer blend which comprises:
   (a) from about 15 to about 50 weight percent of an acrylic polymer which comprises the emulsion polymerization product of at least one ethylenically unsaturated non-carboxy finctional monomer, from 0.1 to 5 pphm of at least one ethylenically unsaturated carboxy-functional monomer, from 0.01 to 2 pphm of a sterically hindered alkoxylated silane monomer, and at least one anionic surfactant, wherein the sterically hindered alkoxylated silane monomer has the structure $$R^1\text{---Si---}(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
   (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

3. A non-agqueous-solvent-free coating composition comprising an acrylic modified ethylene-vinyl acetate polymer blend which comprises:
   (a) from about 15 to about 50 weight percent of an acrylic polymer which comprises the emulsion polymerization product of at least one ethylenically unsaturated non-carboxy functional monomer, from 0.1 to 5 pphm of at least one ethylenically unsaturated carboxy-functional monomer, from 0.1 to 5 pphm of at least one wet adhesion monomer, from 0.01 to 2 pphm of a sterically hindered alkoxylated silane monomer, and at least one anionic surfactant, wherein the sterically hindered alkoxylated silane monomer has the structure $$R^1\text{---Si---}(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
   (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

4. The coating composition according to claim 1 wherein the sterically hindered alkoxylated silane monomer is selected from the group consisting of vinyltriisopropoxy silane, vinylpropyltriisopropoxy silane, vinylpropyltriisobutoxy silane, vinyltriisobutoxy silane, vinylpentyltri-t-butoxy silane, vinylpropylmethyldipentoxy silane, vinylpropyltri-sec-butoxysilane, and combinations thereof.

5. The coating composition according to claim 4 wherein the sterically hindered alkoxylated silane monomer is vinyl-triisopropoxysilane.

6. A method of coating a substrate comprising:
   (I) preparing an acrylic modified ethylene-vinyl acetate polymer blend which comprises:
   (a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure $$R^1\text{---Si---}(OR^2)_n(R^3)_{3-n}$$

wherein $R^1$ is selected from the group consisting of an alkylene, arylene, and aralkylene group; R2 is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
   (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate;
   (II) applying the polymer blend to at least one surface of a substrate; and (III) drying the polymer blend to form a film.

7. A method of coating a substrate comprising:
(I) preparing an acrylic modified ethylene-vinyl acetate polymer blend which comprises:
(a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure

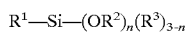

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
(b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate;
(II) mixing a Lewis acid or a tin catalyst with the acrylic modified ethylene-vinyl acetate polymer blend to form a coating composition;
(III) applying the coating composition to at least one surface of a substrate; and
(IV) drying the coating composition to form a film.

8. The method according to claim 7 wherein the Lewis acid is selected from the group consisting of carboxylic acids, dicarboxylic acids, mineral acids, sulfuric acid, phosphoric acid, and combinations thereof.

9. The method according to claim 7 wherein the Lewis acid is added in an amount of from about 0.1 to about 5 weight percent based on the percent solids of the polymer.

10. The coating composition according to claim 3 wherein the wet adhesion monomer is a ureido-functional monomer.

11. The coating composition according to claim 10 wherein the ureido-functional monomer is selected from the group consisting of N-(2-methacryloyloxyethyl) ethylene urea, N-(2-methacryloxyacetamidoethyl)-N,N'-ethyleneurea, allylalkyl ethylene urea, N-methacrylamidomethyl urea, N-methacryoyl urea, N-(methacrylamido)ethyl urea, allyl carbamato ethyl ethylene urea, and allyl ureido monomer.

12. The coating composition according to claim 11 wherein the ureido-functional monomer is N-(2-methacryloyloxyethyl) ethylene urea.

13. A substrate comprising at least one surface coated with a non-aqueous—solvent-free coating composition comprising an acrylic modified ethylene-vinyl acetate polymer blend which comprises:
(a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure

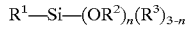

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and
(b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

14. The coating composition according to claim 1 wherein the ethylenically unsaturated non-carboxy functional monomer is selected from the group consisting of vinyl esters, a-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

15. The coating composition according to claim 14 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate.

16. The coating composition according to claim 14 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

17. The coating composition according to claim 14 wherein the substituted or unsubstituted mono and dialkyl esters of unsaturated dicarboxylic acids are selected from the group consisting of substituted and unsubstituted mono and dibutyl maleate esters, mono and diethyl maleate esters, and the corresponding fumarates of such esters.

18. The coating composition according to claim 14 wherein the vinyl amide monomers are selected from the group consisting of N-vinyl formamide and N-vinyl acetamide.

19. The coating composition according to claim 14 wherein the vinyl aromatic monomer is selected from the group consisting of styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

20. The coating composition according to claim 14 wherein the ethylenically unsaturated monomer is selected from the group consisting of methylmethacrylate, butyl acrylate, 2-ethylhexyl acrylate, vinyl acetate, and combinations thereof.

21. The coating composition according to claim 2 wherein the ethylenically unsaturated carboxy-functional monomer is selected from the group consisting of $\alpha,\beta$-ethylenically unsaturated $C_3$–$C_8$ monocarboxylic acids, $\alpha,\beta$-ethylenically unsaturated $C_4$–$C_8$ dicarboxylic acids and the anhydrides thereof, $C_4$–$C_8$ alkyl half esters of the $\alpha,\beta$-ethylenically unsaturated $C_4$–$C_8$ dicarboxylic acids, and combinations thereof.

22. The coating composition according to claim 21 wherein the ethylenically unsaturated carboxy-functional monomer is selected from the group consisting of acrylic acid, methacrylic acid; and the $C_4$–$C_8$ alkyl half esters of maleic acid, maleic anhydride, fumaric acid and itaconic acid.

23. The coating composition according to claim 22 wherein the ethylenically unsaturated carboxy-functional monomer is acrylic acid or methacrylic acid.

24. The coating composition according to claim 2 wherein the ethylenically unsaturated carboxy-functional monomer is present in an amount of from about 0.5 to about 3 pphm.

25. In a paint formulation comprising at least one pigment, rheology modifier, and surfactants, wherein the improvement comprises adding an acrylic modified ethylene-vinyl acetate polymer blend which comprises:

(a) from about 15 to about 50 weight percent of an acrylic polymer which comprises the emulsion polymerization product of at least one ethylenically unsaturated non-carboxy functional monomer, from 0.01 to 2 pphm of a sterically hindered alkoxylated silane monomer, and at least one anionic surfactant, wherein the sterically hindered alkoxylated silane monomer has the structure $$R^1-Si-(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3; and (b) from about 50 to about 85 weight percent of an ethylene-vinyl acetate polymer which comprises the emulsion polymerization product of from about 10 to about 30 weight percent of ethylene and from about 70 to about 90 weight percent of vinyl acetate.

* * * * *